Nov. 7, 1939.  H. DE WITT ET AL  2,179,118

ELECTRICAL ADAPTER

Filed Aug. 24, 1938

WITNESSES
Geo. W. Naylor
A. L. Kitchin

INVENTOR
Harold DeWitt
and Frank Wilburn
BY
Munn, Anderson & Liddy
ATTORNEYS

Patented Nov. 7, 1939

2,179,118

UNITED STATES PATENT OFFICE 2,179,118

ELECTRICAL ADAPTER

Harold de Witt, Pasadena, Calif., and Frank Wilburn, Prescott, Ariz.

Application August 24, 1938, Serial No. 226,602

1 Claim. (Cl. 250—20)

This invention relates to an electrical adapter for attaching the high voltage current of an automobile radio receiving set whereby it may be used for operating an electric shaver and other low power electric devices.

An object of the invention is to provide an improved construction which may be readily connected with the high voltage supply of an automobile radio receiving set and then adjusted to provide 110 volts or any other number of volts necessary for an electric shaver or other lower power electric device.

An additional object of the invention is to provide an adapter for supplying a comparatively low voltage current to an electric device from the high voltage supply of a radio receiving set, whereby means are presented which will prevent electrical disturbances created by the actuation of an electric shaver or other device by current from the radio receiving set.

In the accompanying drawing—

Figure 1:
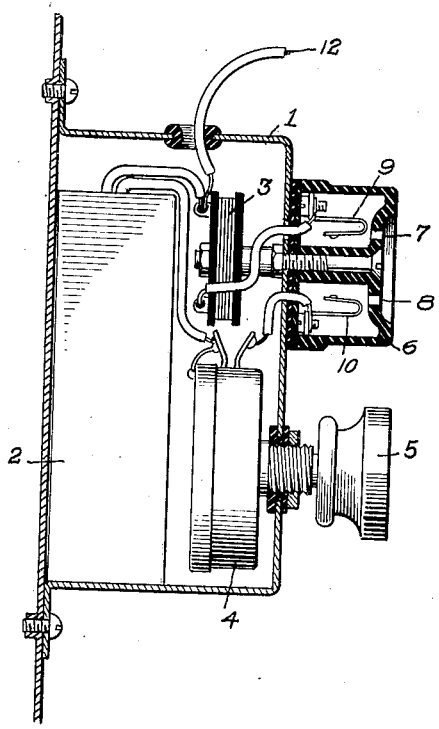
Fig. 1 is a vertical sectional view through Fig. 2 approximately on the line 1—1.
Figure 2:
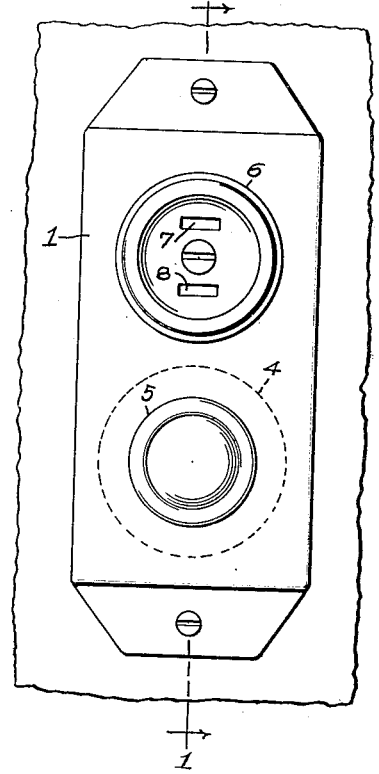
Fig. 2 is an elevation of an adapter disclosing an embodiment of the invention.

The invention contemplates the provision of means which may be connected to the plate circuit or high voltage supply of an automobile receiving set and then provide the necessary reduction voltage to present the proper voltage and current to operate electric shavers or other lower power electric devices. For supplying current from a radio receiving set to a device using 110 volts, means have been provided which will act as a filter to prevent the usual electrical disturbances in the radio receiving set circuit. As shown in the accompanying drawing, there is provided a housing 1 which may be connected in any desired manner to any part of the automobile. In this housing there is provided a filter condenser 2, a filter choke 3, and a variable resistance 4. The resistance 4 is connected with a hand-actuated knob 5 whereby the resistance may be adjusted so that more or less may be inserted into the circuit. Arranged adjacent the knob 5 is a receptacle 6 secured in any desired manner to the housing 1 and exterior thereof and presenting apertures 7 and 8, through which the prongs of a standard plug may extend so as to engage the contacts 9 and 10.

Figure 3:
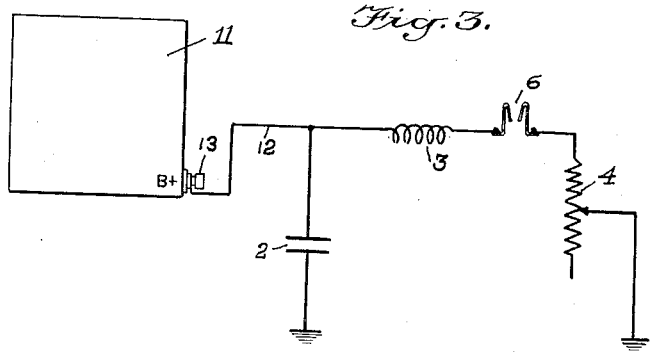
Fig. 3 is a diagram showing the adapter illustrated in Figs. 1 and 2, and illustrating how the same is connected to an automobile radio receiving set.

The construction and operation may be readily seen from the diagram shown in Fig. 3, wherein 11 indicates an automobile radio receiving set which, naturally, is actuated by current from the battery of the automobile. This current is six volts but in the radio receiving set it is stepped up to several hundred volts in the usual way so as to provide the desired voltage for the plate circuit, which is indicated as B+ on the drawing. This presents a high voltage supply so that when the conductor or wire 12 is connected to the post 13 a high voltage will be supplied to the conductor. The conductor 12 is connected to one side of the receptacle 6 while the other side is connected to the ground through the variable resistance 4. In order to prevent electrical disturbances created by an electric shaver or other low power electric device, there is provided a filter choke 3 in the conductor 12. The filter condenser 2 at one side is connected to the conductor 12 between the choke and the binding post 13 and the other side of the condenser is connected to the ground. This provides a filtering arrangement which will prevent noises from the shaver being reproduced in the radio receiving set.

When it is desired to use the device to operate an electric shaver or other low power electric device, the wire 12 is connected to binding post 13. Current will immediately flow if current is being supplied to the radio receiving set and the voltage may be readily adjusted by turning the knob 5 and accordingly adjusting the resistance 4.

Ordinarily electric shavers and certain other electrically operated devices operate on a 110-volt line but use very little current. By the construction just described ample current at the desired voltage may be secured for an electric shaver or other device using a small amount of current and a standard voltage. It is, of course, understood that more or less voltage could be provided in the receptacle 6 by adjusting the variable resistance 4. However, in most parts of the country 110 volts is the standard voltage and various electric devices are made to operate on this voltage. The device as shown in the accompanying drawing may be adjusted to provide this voltage though the current will be small but ample for electric devices of the kind mentioned.

We claim:

The combination with an automobile radio receiving set, of an adapter for supplying high voltage current from said radio receiving set to a low power electrically actuated shaver, comprising a conductor connected to one side of said shaver and to the high voltage supply of said radio receiving set, a filtering system connected to said conductor to prevent electrical disturbances produced by the shaver from disturbing the usual functioning of the radio receiving set, a conductor for connecting the other side of said shaver to the ground and a variable resistance interposed in the last-mentioned conductor.

HAROLD DE WITT.
FRANK WILBURN.